Nov. 2, 1948. J. J. BONEKAMP 2,452,629
CAKE PROTECTING DEVICE
Filed June 24, 1946
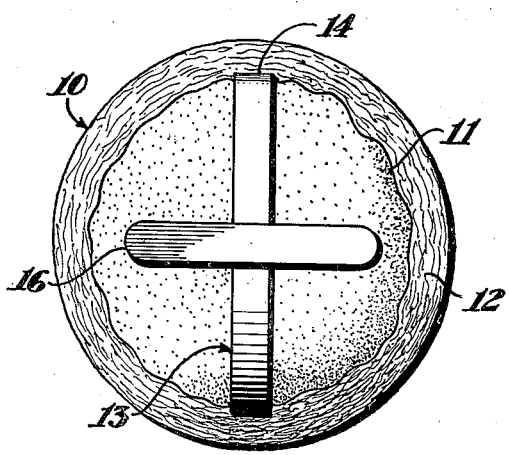
Fig. 1
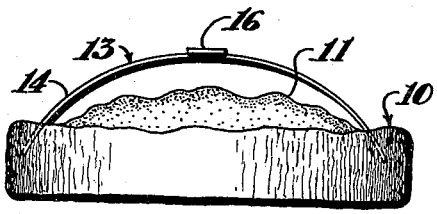
Fig. 2
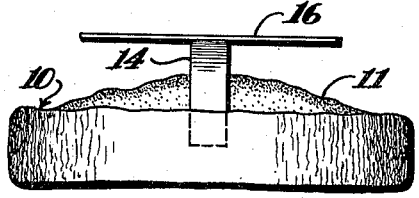
Fig. 3
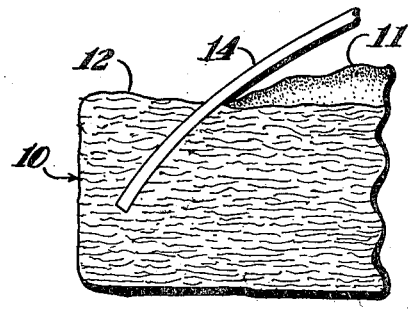
Fig. 4
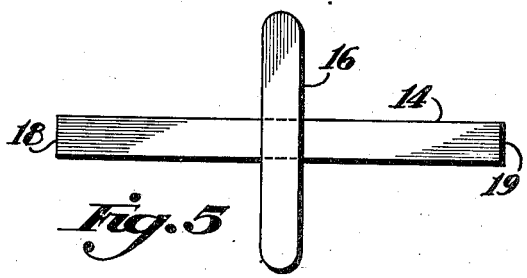
Fig. 5
Fig. 6
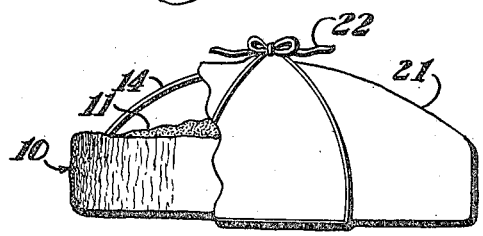
Fig. 7
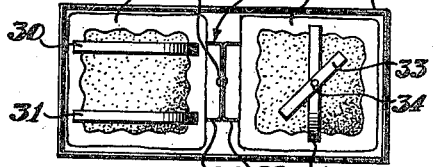
Fig. 8
INVENTOR.
Joseph J. Bonekamp
BY
Wood, Arey, Herron & Evans
ATTORNEYS Patented Nov. 2, 1948

2,452,629

UNITED STATES PATENT OFFICE 2,452,629

CAKE PROTECTING DEVICE

Joseph J. Bonekamp, Cincinnati, Ohio

Application June 24, 1946, Serial No. 678,747

1 Claim. (Cl. 99—171)

This invention relates to a device for use in wrapping cakes, pies, and the like and, more particularly, relates to a device for use in protecting icing on a cake or pie from contact with paper used in wrapping the cake.

Cakes and pies having soft fillings and icings are normally wrapped with tissue paper, wax wrappings, or other wrappings when sold in a store. The wrappings protect the icing from contact with external objects. However, the icing can adhere to the wrapping paper; and, when the wrapping is removed, the icing adhering to the wrapping paper is pulled free from the cake, thus injuring the cake's appearance. Therefore, it is a principal object of this invention to provide a simple, inexpensive device for protecting icing against contact with wrapping paper.

Accordingly, this invention provides a small cardboard device made preferably from a pair of strips of cardboard attached together which can be attached to a cake or pie to form a protective arch over the icing. The strips can be attached together at their central points to form a cross-shape and two or more tips of the cardboard strips are inserted into the edges of the cake or pie to be protected in such a manner that the device extends above the icing to form a protective arch which prevents contact between wrapping paper and icing.

With the above features and objects in view, the invention will now be described with reference to the accompanying drawing which illustrates a preferred embodiment of the invention:

Figure 1 is a plan view showing an iced cake with a protective device constructed in accordance with this invention attached to a cake.

Figure 2 is a side elevational view of the cake and device illustrated in Figure 1.

Figure 3 is a front elevational view of the cake and protective device illustrated in Figure 1.

Figure 4 is an enlarged detailed sectional view showing an end of one of the cardboard strips inserted into the body of the cake.

Figure 5 is a plan view showing a protective device prior to attaching to a cake.

Figure 6 is a side elevational view of the device shown in Figure 5.

Figure 7 is a side elevational view showing a cake and device wrapped, the wrapping being partly broken away to show the cake and protective device.

Figure 8 is a plan view showing two cakes wrapped together and separated by a protective device.

In the drawings a cake is referred to by the designation 10. The cake has a soft icing or filling 11 built into the central portion of the cake 10 and an annular section 12 of cake surrounds the filling 11. A protective device 13 is attached to the cake and extends upwardly from the cake, as shown in Figure 2, to form an arch above the icing 11.

The protective device in the preferred embodiment is formed of two strips of cardboard, Bristol board, or the like which are attached together at their central points as shown in Figures 5 and 6. One of the strips 14 is somewhat longer than the other strip 16 and has blunt ends 18 and 19. The blunt ends 18 and 19 are designed to be inserted into the cake body as shown in Figure 4. Blunt or substantially squared ends are preferably employed in order to support the protective device in such a manner that it does not easily swing about the axis provided by the ends 18 and 19 when inserted in the cake, but instead stands firmly upright when attached to the cake. However, the ends may be pointed, if desired, for use in inserting into the cake or other bakery goods.

The strip 16 is made somewhat shorter than the strip 14 and the ends of the strip 16 project outwardly from the strip 14 and are not inserted in the body of the cake. When the ends 18 and 19 of the device are inserted in the cake, the device forms a protective arch and wrapping paper 21, can be wrapped about the cake as shown in Figure 7 and tied firmly with string 22 without the paper being forced into contact at any point with the icing 11. Thus, the icing is completely protected against contact with the wrapping paper and cannot adhere thereto.

When wrapped in the manner illustrated in Figure 7, a cake can be subjected to much rougher treatment than can an unprotected cake because the protective device forms a relatively sturdy protection over the iced portion. The cake can even be turned upside down to rest upon the protective arch without the icing being made to touch the wrapping paper.

When the cake is unwrapped, the protective device is easily and quickly pulled free from the top of the cake leaving only two small, unobtrusive openings where the ends 18 and 19 of the strip 14 had been inserted.

The protective strips may be formed flat as illustrated in Figures 5 and 6, or they may be preformed to include a curve of the proper dimensions for easy insertion into a cake. In addition, the strips may be permanently connected together in a cross-shaped configuration or a pivot connection may be employed between the strips to permit the strips to be aligned for storage purposes.

In Figure 8 is illustrated a pair of cakes 23 and 24, packed in a single box 25, with a protective device 26 used to separate the cakes. The protective device 26 is inserted between the cakes. The strips 27 and 28 are preferably aligned so that the strips are parallel and the points of the strip 27 and of the second strip 28 are bent in opposite directions so that the points of the strip 27 can be inserted in the cake 23 while the points of the strip 28 are inserted into the cake 24. For this purpose, strips having a pivotal connection 29 between the strips are preferably employed, and the strips can be pivoted either to be parallel to one another for use to separate two pieces of confectionery as shown in Figure 8 or to form a cross-shaped configuration for protecting a single cake, as illustrated in Figure 7.

The invention has been described with relation to the preferred embodiment which has been illustrated in Figures 1 to 7. However, many variations are possible and will be apparent to one skilled in the arts. For example, a single strip may be used instead of two strips joined together at their central points. This strip may be pre-formed with curved or bent ends adapted at once to be inserted into the bakery goods to be protected, or the tips of the strip may be scored with transverse lines of weakening to provide an aid in bending the tips into place for insertion. Additionally, two or more single strips may be used either parallel to each other or crossing each other; and the points at which strips cross may, if desired, be connected by means of a pivot joint, a glued joint, a clamp fastener or other fastener, or the strips may be used without any means of attaching strips together.

In Figure 8, two parallel strips 30 and 31 are shown protecting the top of the cake 23; while the cake 24 is protected by a long strip 32 and a short strip 33 connected together by a pivot joint 34, the shorter strip being aligned at an acute angle with the longer strip to provide an arch above the cake 24.

An additional way in which the devices of this invention may be used is between two cakes, one of which is packed on top of the other. The device, when inserted in one cake can be strong enough to support the weight of a second cake above it and still hold the second cake sufficiently high above icing on the lower cake to protect the icing.

The methods of use for this protective device which have been pointed out above are merely illustrative and other uses will be readily apparent to the skilled mechanic or baker.

Having described my invention, I claim:

A protective device for bakery products having a soft upper surface comprising a pair of strips of cardboard pivotally joined together adjacent their central points to permit adjustment of said strips at right angles to one another with their flat surfaces contacting about the pivot, one of said strips being longer than the other, the longer of said strips being adapted to be bent to a bowed configuration to permit the ends thereof to be inserted into the upper surface of the bakery products while the main body of said longer strip and the entire length of the shorter strip are out of contact with said upper surface.

JOSEPH J. BONEKAMP.

REFERENCES CITED

The following references are of record in the file of this patent:

UNITED STATES PATENTS

| Number | Name | Date |
| --- | --- | --- |
| 2,106,425 | Grant | Jan. 25, 1938 |
| 2,339,584 | Rice | Jan. 18, 1944 |